United States Patent [19]

Fitzgerald, Jr. et al.

[11] Patent Number: 4,855,939

[45] Date of Patent: Aug. 8, 1989

[54] 3D DIMENSIONING IN COMPUTER AIDED DRAFTING

[75] Inventors: William J. Fitzgerald, Jr., Ridgefield, Conn.; Raymond G. Glemser, II, Center Valley, Pa.

[73] Assignee: International Business Machines Corp., Armonk, N.Y.

[21] Appl. No.: 96,171

[22] Filed: Sep. 11, 1987

[51] Int. Cl.$^4$ .............................................. G06F 3/14
[52] U.S. Cl. .................................... 364/522; 340/724; 364/512; 364/521
[58] Field of Search ............... 364/518, 521, 522, 523, 364/512; 340/720, 724

[56] References Cited

U.S. PATENT DOCUMENTS

| | | | |
|---|---|---|---|
| 3,621,214 | 11/1971 | Romney et al. | 235/151 |
| 4,275,449 | 6/1981 | Aish | 364/512 |
| 4,549,275 | 10/1985 | Sukonick | 364/521 |

Primary Examiner—Gary V. Harkcom

Assistant Examiner—H. R. Herndon
Attorney, Agent, or Firm—Whitham and Marhoefer

[57] ABSTRACT

A computer aided drafting (CAD) procedure presents, for a three dimensional (3D) object to be modeled in a general purpose computer, dimensional and tolerance parameters appropriate to changes of view or parameters. The procedure requires but one model, the three dimensional solid model, for producing both dimensioned displays of the model and dimensioned drawings of views of the model. Dogleg extension lines are used to express 3D dimensions without ambiguity. These dogleg extension lines facilitate the presentation of information on paper or on a display screen and permit convenient alteration of presentations of 3D illustrations, with automatic correction of dimension and tolerance presentation. The operator of the CAD system enters dimension and tolerance information on a plan or elevation view, and this information is automatically converted to an appropriately corrected and presented axonometric presentation.

7 Claims, 13 Drawing Sheets

PERMISSIBLE
FIG. 1C

INCORRECT
FIG. 1F

CORRECT
FIG. 1B

AVOID, IF POSSIBLE
FIG. 1E

PREFERRED
FIG. 1A

AVOID, IF POSSIBLE
FIG. 1D

FIG. 2B INCORRECT

FIG. 2A CORRECT

3D DIMENSIONING IN COMPUTER AIDED DRAFTING

BACKGROUND OF THE INVENTION

1. Field of the Invention

The present invention generally relates to computer aided drafting (CAD) systems and, more particularly, to a procedure which permits the addition of dimensions to three dimensional (3D) computer models without the necessity of two models and also permits automatic documentation.

2. Description of the Prior Art

It is now possible to build solid models of parts in a general purpose computer. These models can be used to calculate properties of the parts, such as center of gravity and moments of inertia. They can also be used to test for interference between parts. Parts which are defined in a solid modeling system are not completely designed for manufacture until one adds dimensions and tolerances to the model. These dimensions and tolerances are traditionally included on the drawing of the part.

Current practice is to make projections of the solid model and send these to a two dimensional (2D) drafting system, where dimensions and tolerances are added and a complete engineering drawing is produced. The major problem with this approach is that there are two models, the 3D solid model and the 2D drawing model. When numerous changes are in progress, it is difficult to keep these two models consistent. Therefore, it would be desirable to be able to add the dimensions and tolerances to the solid model and have only one model.

Some tolerances, such as geometric forms, are parts of leaders and others are parts of dimensions on the drawing. In addition, there are usually default linear and angular tolerances in the title block of the drawing. If a dimension is shown on the drawing without a tolerance and is not declared basic or reference, then the appropriate title block tolerance applies. Since so many people are familiar with these conventions, it is desirable that a solid modeling system be consistent with them. Therefore, leaders and dimensions which can be applied to solid models are needed.

SUMMARY OF THE INVENTION

It is therefore an object of this invention to provide a 3D dimensioning procedure for CAD systems in which there is but one model, the 3D solid model, and wherein dimensions and tolerances are added to the solid model.

It is another object of the invention to provide a 3D dimensioning procedure for CAD systems that automatically supplies correct 2D leaders and dimensions when the solid model is viewed so as to produce a drawing.

According to the invention, a solid modeling system which is capable of presenting a range of views of a 3D object carries certain numerical data as linestrings that represent dimension arrows and extension lines. Dogleg extension lines are exceptionally capable of expressing 3D dimensions without ambiguity; they facilitate presentation of dimension and tolerance information on paper or on a display screen and permit convenient alteration of dimensions or presentations of 3D illustrations, with automatic preservation of dimension and tolerance information. The operator of the CAD system enters dimension and tolerance information on a plan or elevation view. The invention converts this information to an appropriately corrected and presented axonometric presentation, e.g. isometric.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION

Problems of Dimensioning 3D Objects

In order to better understand the invention, it is necessary to briefly review the conventions currently observed in dimensioning axonometric views of solid models. A solid model can be viewed so as to produce a standard drawing view, i.e. a principal, cross section, auxilliary or detail view, in which case it is desirable for the dimensions to follow the standards for dimensions on a drawing as set forth, for example, in "Dimensioning and Tolerancing", American National Standard Y14.5 from American Society of Mechanical Engineers, 345 East 47th Street, New York, N.Y. 10017. A solid model also can be viewed so as to produce any axonometric, e.g. isometric, view but these views in traditional drawings are not often dimensioned.

In drafting textbooks, there are often a few pages devoted to describing dimensioning axonometric projections. Basically, conventional dimensions are used, but they are skewed to be parallel with the axes of the part. As one example, FIGS. 1A to 1F taken from the textbook *Technical Drawing* by F. E. Giesecke, A.

Figure 1A:
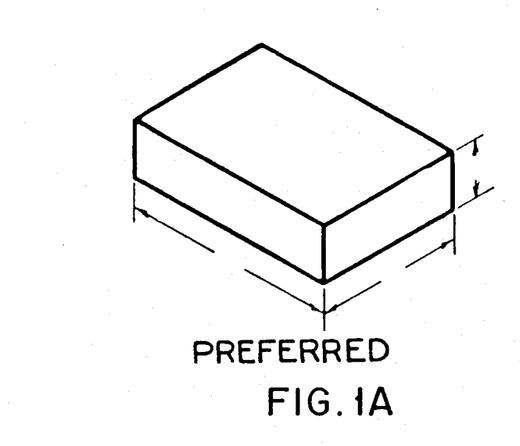
FIGS. 1A to 1F are illustrations taken from a drafting textbook illustrating various possible dimensioning of an isometric view.
Figure 1B:
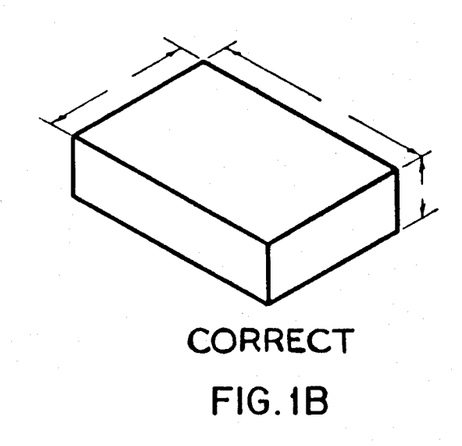
Figure 1C:
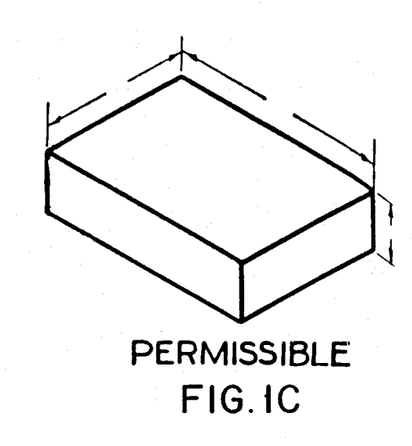
Figure 1D:
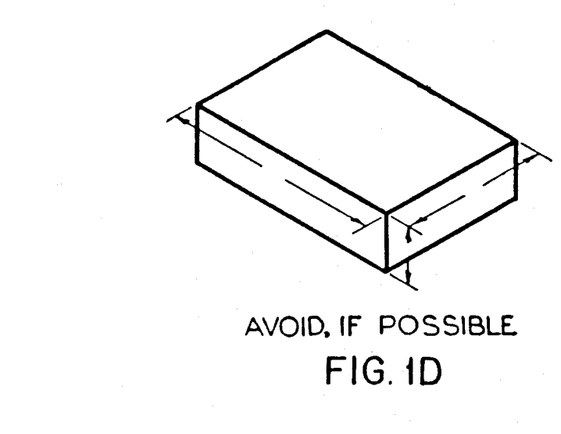
Figure 1E:
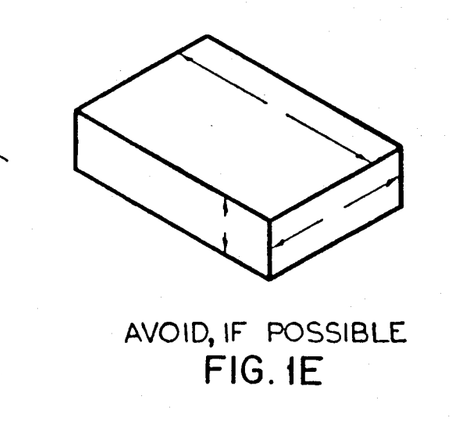
Figure 1F:
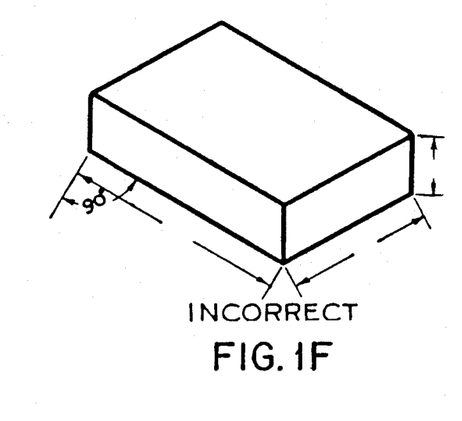
Figure 2A:
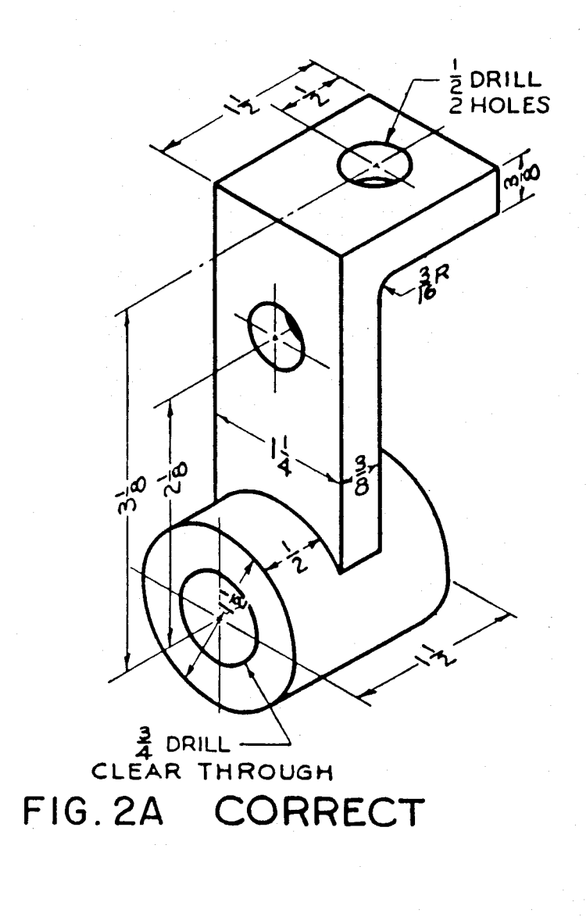
FIGS. 2A and 2B are illustrations taken from a drafting textbook illustrating problems in dimensioning a complex isometric view.
Figure 2B:
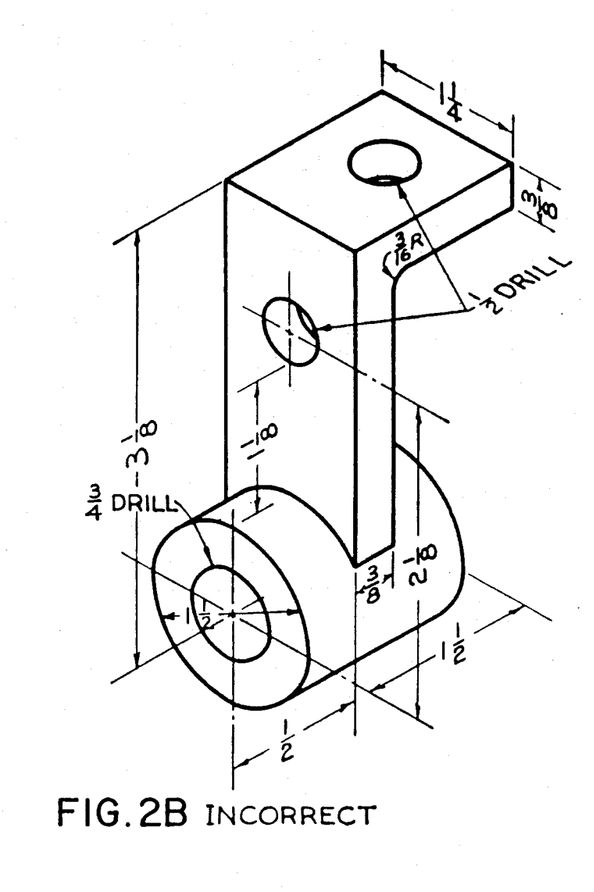

Mitchell and H. C. Spencer, published by The Macmillan Co. of New York, show that dimensions should be drawn in the planes to which they apply. There are new pitfalls as shown in FIG. 2B where the 3⅛ dimension is incorrect because the dimension line and dimensioned points are not coplanar in 3D space.

Figure 3:
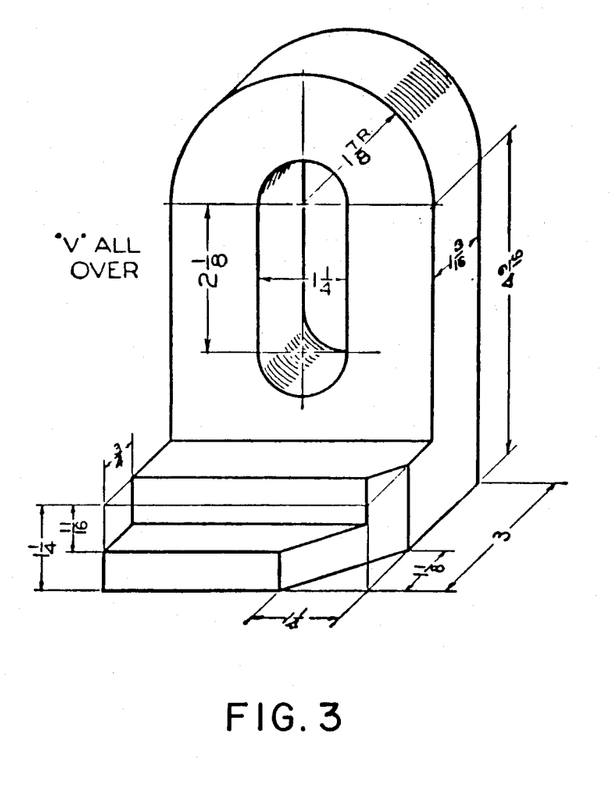
FIGS. 3 and 4 are illustrations taken from a drafting textbook showing typical dimensioned axonometric views from which a student is to draw conventional plan views.
Figure 4:
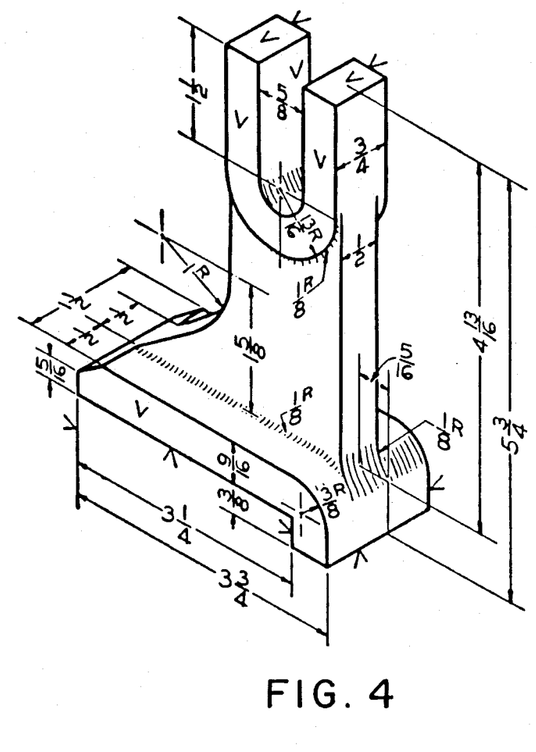

The greatest usage of dimensions on axonometric views seems to be found also in drafting textbooks. The author of a textbook may present the reader a dimensioned axonometric view and ask the reader to draw a conventional view. Such an example illustrates additional evidence of the increased difficulty of dimensioning in axonometric views. For example, in FIG. 3 from the Giesecke et al textbook it can be seen that additional construction lines have been added to permit the use of conventional dimensions. In FIG. 4, it will be observed that the 5¾ dimension is from a plane to an edge. This is confusing and would be troublesome to implement in a computerized system. These examples demonstrate that conventional dimensioning is not general enough to handle axonometric cases conventionally.

Figure 5:
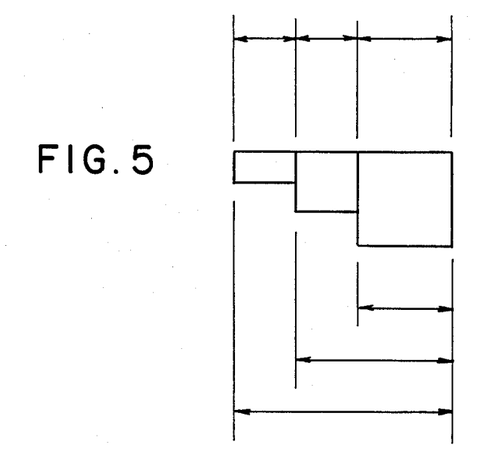
FIG. 5 is a plan view of a solid model showing the use of baseline or datum dimensions.
Figure 6:
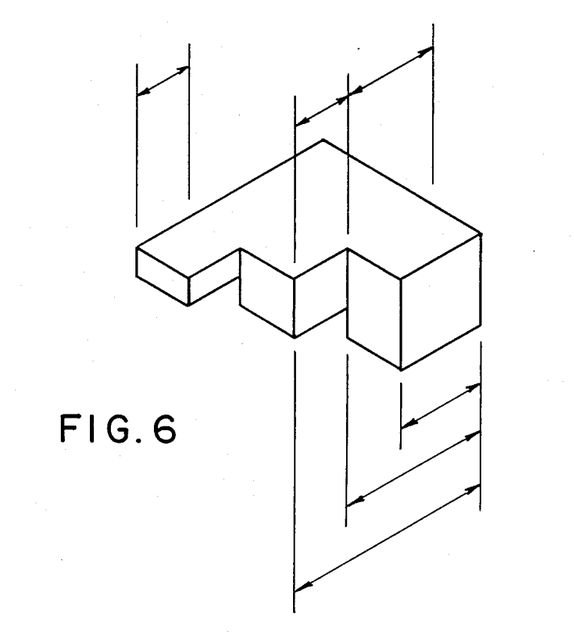
FIG. 6 is an axonometric view of the solid model shown in plan view in FIG. 5 showing that the use of baseline or datum dimensions can be misleading.

There are additional problems introduced when one wishes to dimension a 3D model because the model and its associated dimensions can be viewed from any angle. The first problem occurs with baseline or datum dimensions. Baseline dimensions can be used as shown on the bottom of FIG. 5. If the viewpoint is rotated and the dimensions are restricted to be in a single plane, the dimensions may appear as shown at the bottom of FIG. 6. This is very misleading since the left extension lines of the two longer dimensions are pointing to incorrect vertices.

A second problem occurs even in individual dimensions in this situation. In FIG. 5, there are vertices directly behind one another, and the user does not care which one is used. However, when the part is viewed as in FIG. 6, it does make a difference. If a convention is adopted that the dimension will be in a plane through the first vertex and parallel to the plane of the paper of FIG. 5, then we may get dimensions as shown at the top of FIG. 6. On a crowded drawing, these could be easily misinterpreted.

Figure 7:
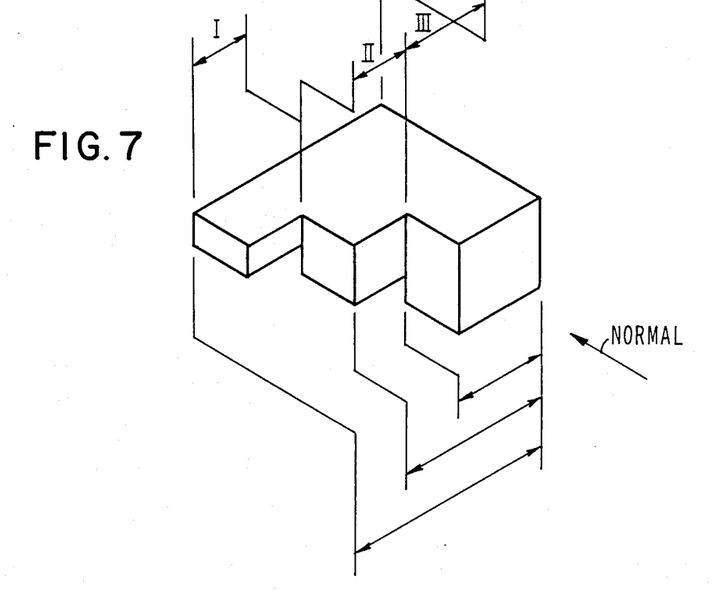
FIGS. 7 and 8 are axonometric views of the solid model shown in plan view in FIG. 5 illustrating the dimensioning process according to the present invention.

The solution to the first problem is to generalize the conventional 2D dimensions to 3D dimensions. For a linear 3D dimension, we will permit an extension line to be broken and to extend out of the plane of the conventional 2D dimension as shown in FIG. 7. Note that the baseline dimensions are now pointing to correct vertices and, if viewed along the indicated normal viewing direction, will appear as in FIG. 5.

Figure 8:
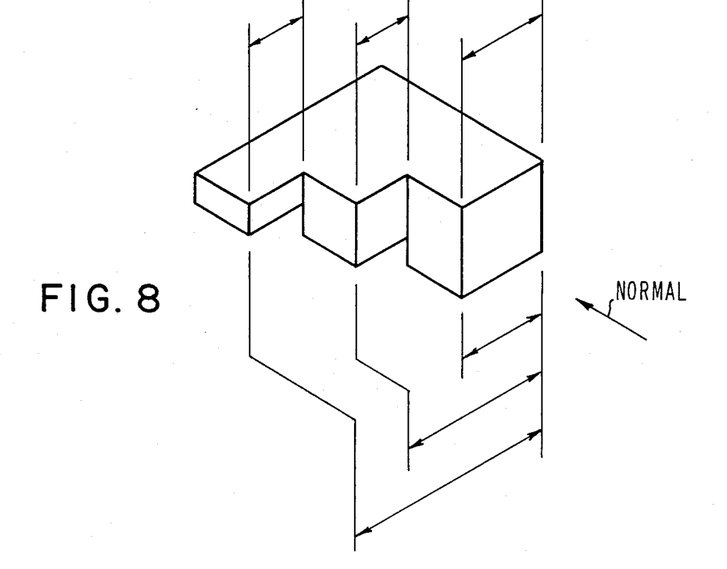

This has also improved the second problem, because the non-baseline dimensions now also point to the correct vertices and, if viewed along the indicated normal viewing direction, will appear as in FIG. 5. If the user entered the dimensions on the view of FIG. 7, he would probably do a neater job, such as shown in FIG. 8. A dimension in FIG. 7 can be changed to its representation in FIG. 8 by moving one or both extension lines to another vertex, which is equivalent along the normal viewing direction. The complete solution then involves a program that can find these equivalent vertices so the system can build dimensions without broken extension lines when possible.

Figure 9:
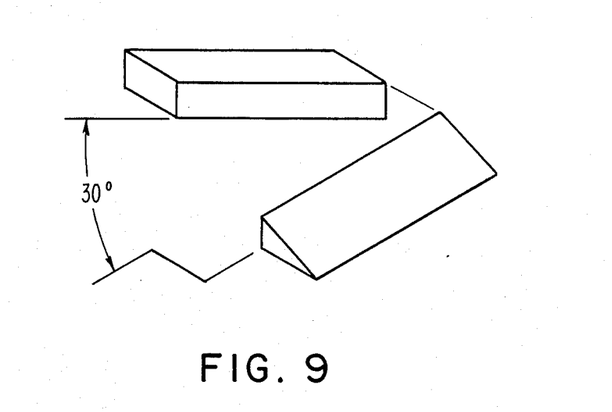
FIG. 9 is an axonometric view of a solid model showing how angular dimensioning is handled by the present invention.

Similar problems exist for an angular dimension, as shown in FIG. 9. There are cases, such as shown in FIG. 9, where the lines to be dimensioned are not in the same plane (the box has been rotated about the dashed line 30 degrees up from the plane on which the prism rests). The broken extension line helps to relate the dimension to the upper extension line in the figure. A variation of this would be to draw the dimension on another plane parallel to the one shown in which case two broken extension lines may be required.

DESCRIPTION OF THE PREFERRED EMBODIMENT OF THE INVENTION

Figure 10A:
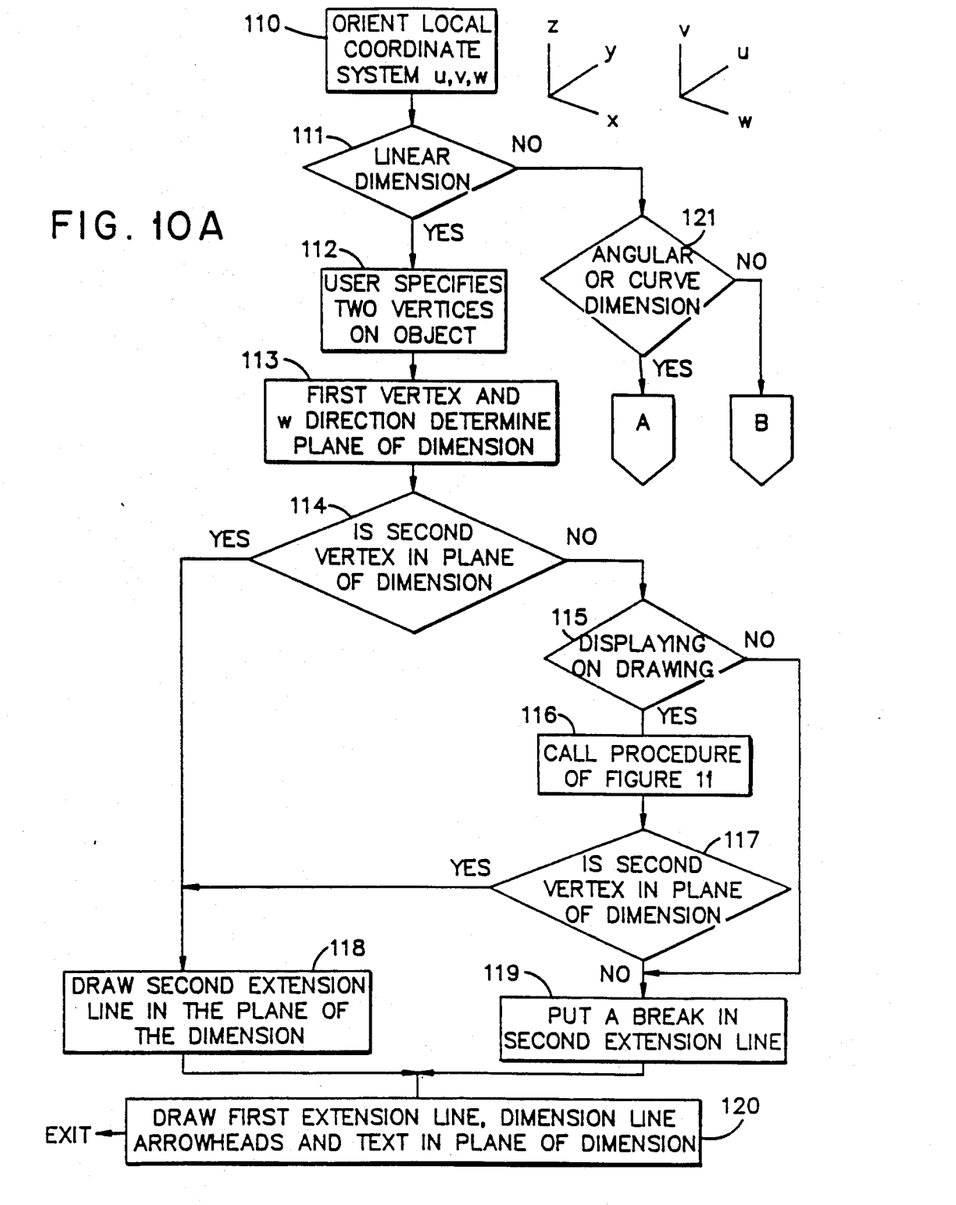
FIGS. 10A and 10B, taken together, are a flow chart of the procedure according to the invention.
Figure 10B:
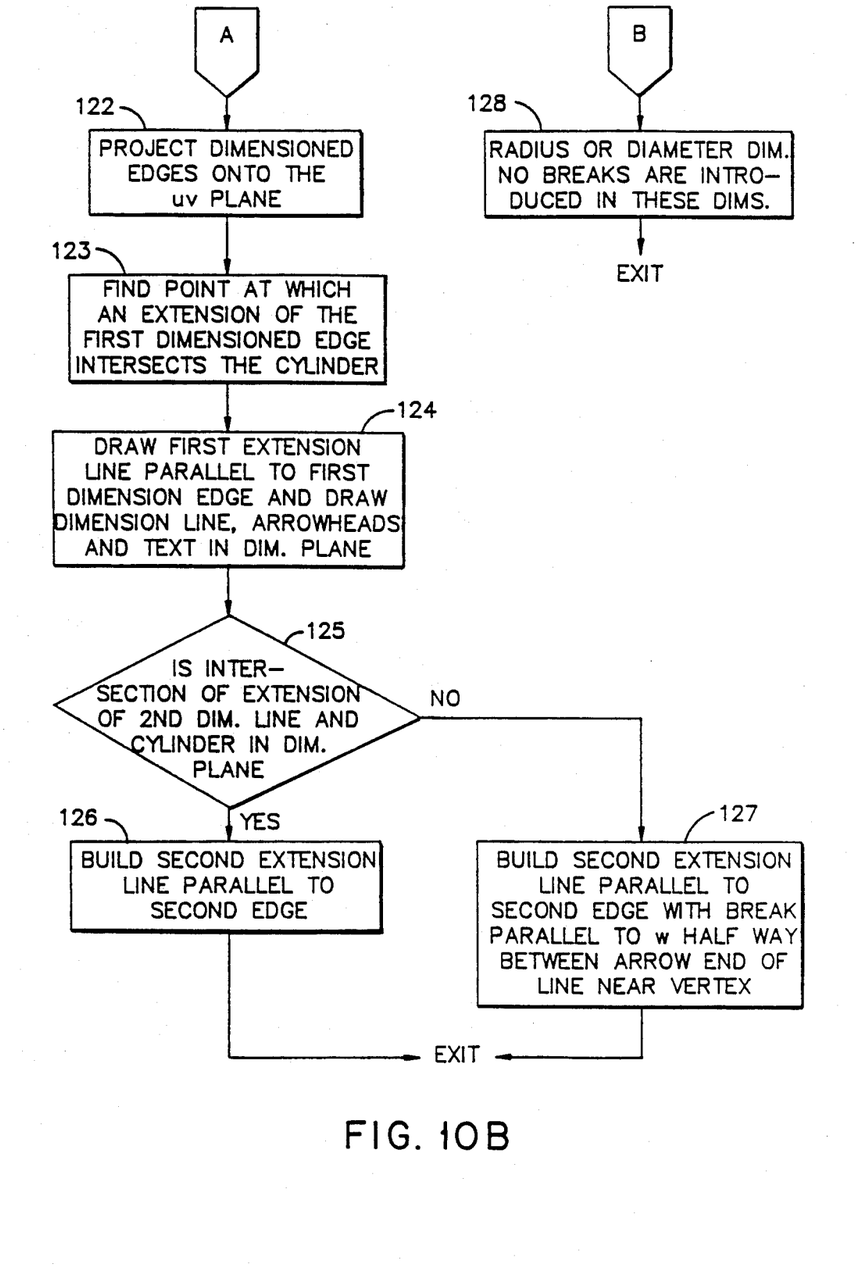

Having described the invention in general terms, reference is now made to FIGS. 10A and 10B which show a detailed flow chart of the procedure according to the invention. To begin the procedure, the local coordinate system u,v,w is oriented so that the w direction gives the desired normal for dimensions and u is in the desired direction as indicated in function block 110. A test is then made in decision block 111 to determine if a linear dimension is being entered. Assuming for the time being that a linear dimension is being entered, the user specifies two vertices on the object (or, as will be discussed subsequently, edges, circles and arcs) as indicated in function block 112. In function block 113, the first vertex and the w direction determine the plane of the dimension. A test is next made in decision block 114 to determine if the second vertex is in the plane of the dimension. If not, a test is next made in decision block 115 to determine if the display is being created for a drawing as opposed to the model. If so, then a call is made in function block 116 to the procedure in FIG. 11, described in more detail hereinafter. At this point, the vertices may be changed from those that the user entered. A test is next made in decision block 117 to determine if the second vertex is in the plane of the dimension. If so, control passes to function block 118 which is the same result that would obtain if the test in decision block 114 had been positive. Otherwise, control passes to function block 119, and this is the same result that would obtain if the test in decision block 115 had been negative.

In function block 118, the second extension line is drawn in the plane of the dimension. In function block 119, a break is made in the second extension line. After the procedures of function blocks 118 or 119 have been performed, control passes to function block 120 where the first extension line, dimension line, arrowheads, and text are drawn in the plane of the dimension.

Returning to decision block 111, if a linear dimension is not being entered, then a test is made in decision block 121 to determine if the dimension being entered is an angular or curve dimension such as shown in FIG. 9. If so, the dimension line will be on a cylinder whose axis is parallel to the direction w. In function block 122, the dimensioned edges are projected onto the uv plane. The point at which the extensions of these projections cross is also on the axis of the cylinder. The user supplied level determines the radius of the cylinder. Next, in function block 123, the point at which an extension of the first dimensioned edge intersects the cylinder is found. The plane of the dimension will pass through that point and will be perpendicular to the w axis. In function block 124, the first extension line is drawn parallel to the first dimension edge, then the dimension line, arrowheads and text are drawn in the dimension plane. A test is then made in decision block 125 to determine if the intersection of an extension of the second dimension line and the cylinder is in the dimension plane. If it is, a second extension line is built parallel to the second edge in function block 126 and the procedure exits. Otherwise, a second extension line is built parallel to the second edge with a break parallel to w half way between the arrow end of the line and the vertex, as indicated in function block 127 and, again, the procedure exits.

Assuming now that the test in decision block 121 is negative, then the dimension is assumed to be a radius or diameter dimension as indicated in function block 128. This type of dimension is drawn in function block 128 with no breaks and the procedure exits.

The function referenced in block 116 in FIG. 10A will now be treated in greater detail. The purpose of the procedure according to the present invention is to identify vertices which will permit dimensions such as those of FIG. 7 to be converted to those of FIG. 8 automatically. At the time dimensions are entered a vector, W, such as the normal line of FIG. 7 is defined in 3D by the user. Each dimension then entered must lie on a plane perpendicular to this vector. The first dimension vertex selected by the user determines that plane for that dimension. Therefore, in FIG. 7, the broken extension line is associated with the second vertex selected. In order to put each dimension into a plane, for dimension I the first extension line must be moved, for dimension II the second extension line must be moved, and for dimension III both extension lines must be moved.

Figure 11A:
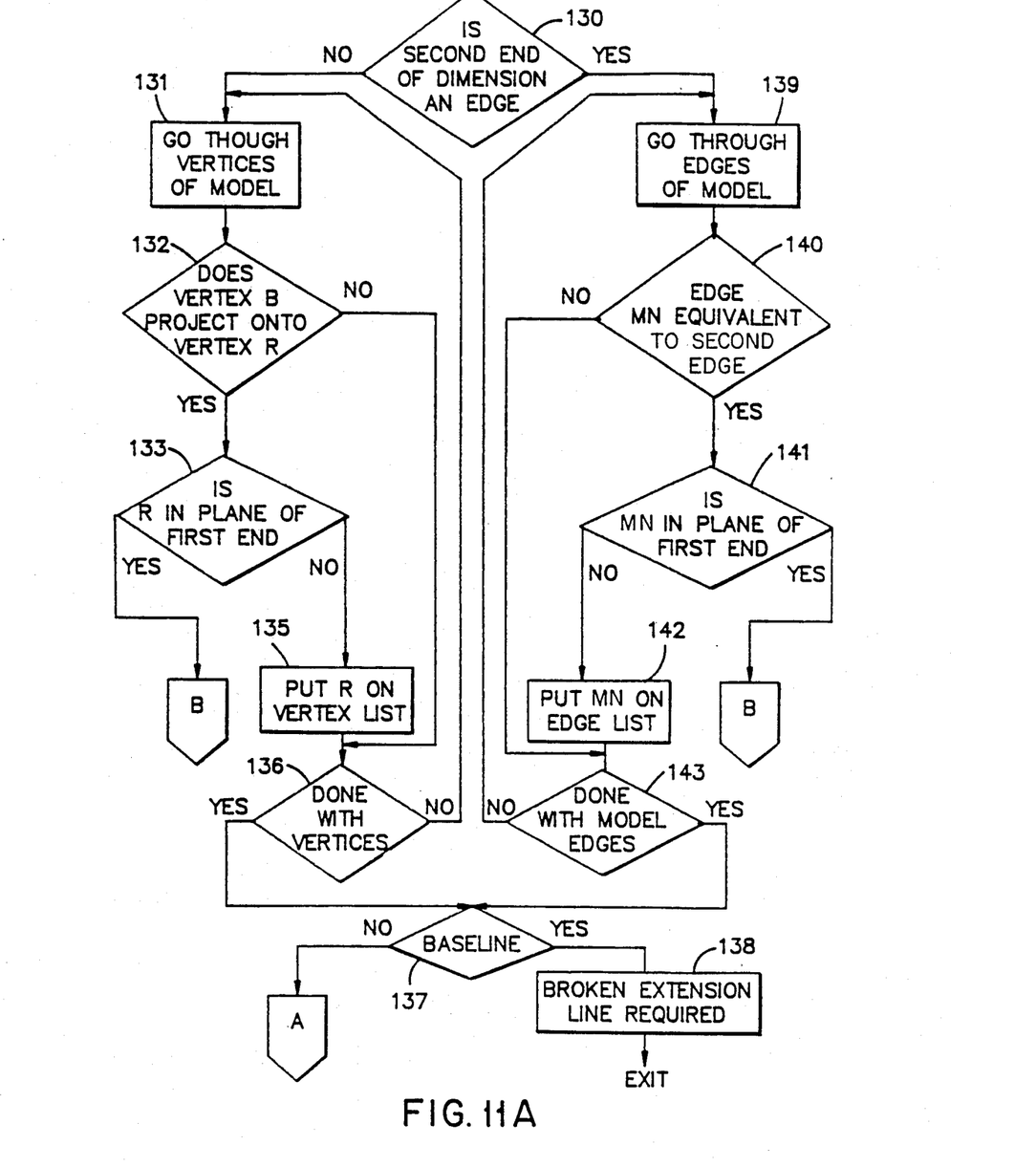
FIGS. 11A, 11B and 11C, taken together, are a flow chart of the generalization of details according to the invention.
Figure 11B:
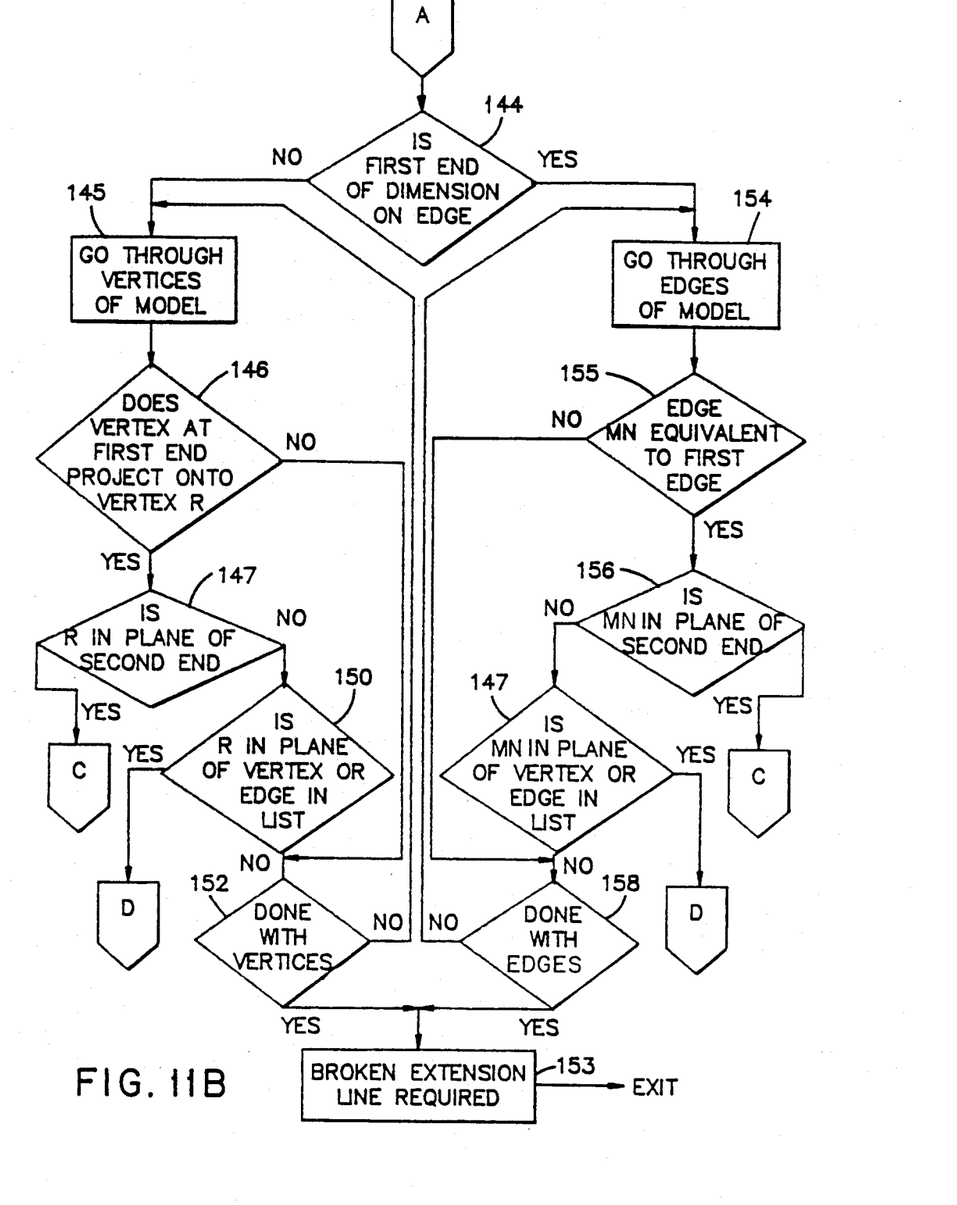
Figure 11C:
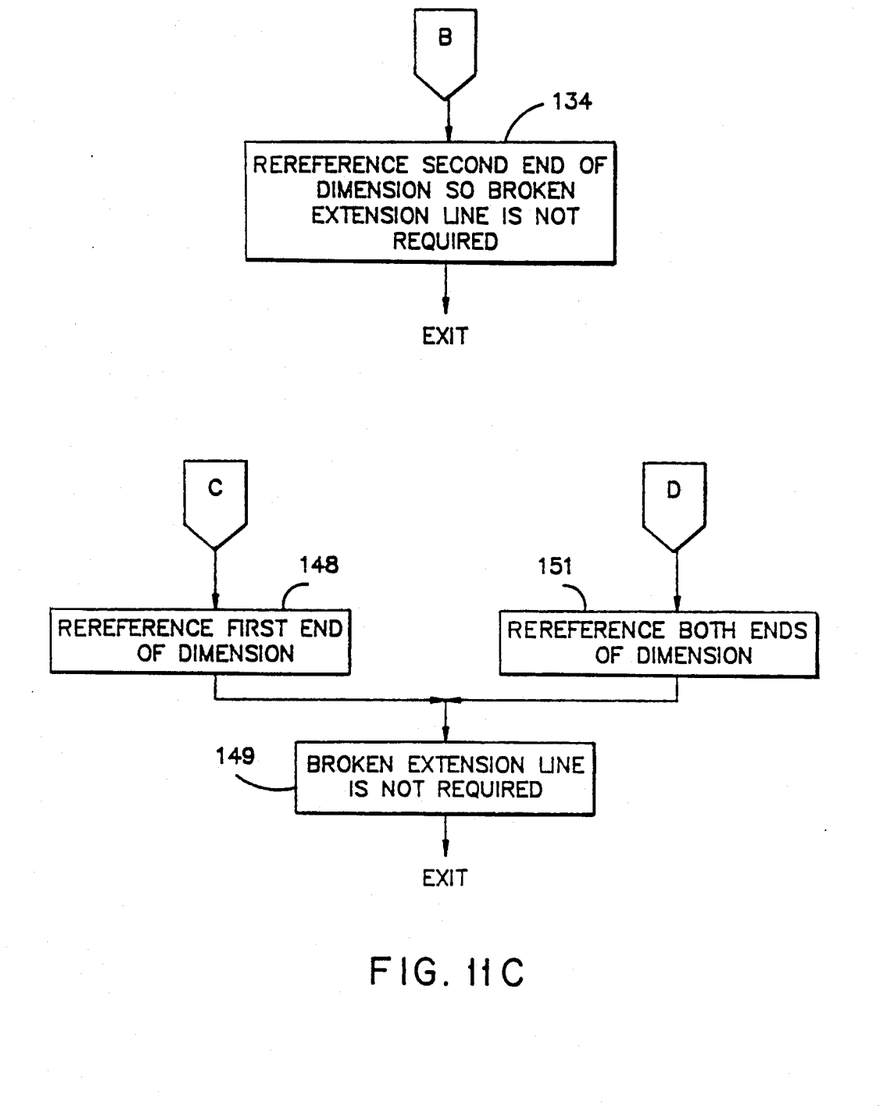

Referring now to FIGS. 11A, 11B and 11C, a generalized procedure is shown for determining whether a broken extension line is required for the second end of a dimension. The procedure begins with decision block 130 which determines whether the second end of the dimension is an edge. If not, a reference is made through the vertices of the model in function block 131 and, in decision block 132, a determination is made as to whether vertex B at the second end of the dimension projects onto the model vertex R. More specifically, if R is transformed into the coordinate system of the dimension, u, v and w, and it differs from B in only its w coordinate, then R projects into B. There should be a tolerance on this test for numerical noise, $\epsilon$, which can be $10^{-10}$ for a system with a precision of 12 digits or more. Then R=B if $$|R_A - B_A| < \epsilon \text{ for } A = u,v$$

Assuming that the test in decision block 132 is positive, a decision is next made in decision block 133 to determine if R is in the plane of the first end of the dimension. Points A and R are on the same w plane if $$A \text{ w} = R \text{ w or}$$

$$(A-R) \text{ w} < \epsilon.$$

Assuming that R is found to be in the plane of the first end of the dimension, the procedure jumps to FIG. 11C where in function block 134 the second end of the dimension is re-referenced so that a broken extension line is not required. The procedure then exits.

Returning to decision block 133, if a determination is made that R is not in the plane of the first end of the dimension, then if not a baseline dimension, R is put on the vertex list in function block 135. This point in the procedure is the same as would obtain if the test in decision block 132 is negative. A test is then made in decision block 136 as to whether all vertices have been tested. If not, the procedure returns to function block 131; otherwise, a test is made in decision block 137 as to whether the dimension is a baseline dimension. If it is, a broken extension line is required as indicated in function block 138. At this point, the procedure exits. If the dimension is not a baseline dimension, the procedure jumps to FIG. 11B which will be described in more detail hereinafter.

Returning now to decision block 130, assume now that the test is positive; i.e., the second end of the dimension is at an edge. In this case, a search is made through the edges of the model in function block 139 and, in decision block 140, a test is made to determine if the edge MN is equivalent to the second edge CD. In addition to the linear dimensions which are referenced to vertices, it is possible to define a linear dimension to an edge. A normal dimension can be perpendicular to an edge. In this case, the edge is straight and in the plane of that end of the dimension. Assume a normal dimension which references edge CD at vertex C and CD is straight. Then, for an edge MN to be equivalent to CD, (1) either M or N must project onto C and (2) if it is M that projects onto C, then MN must have the same direction as CD, or if it is N that projects onto C, then NM must have the same direction as CD. An edge PQ has the same direction as CD if the dot product of their vectors is unity when each vector has unit magnitude:

$$|PQ \text{ CD} - 1| < \epsilon \text{ for } |PQ| = 1 = |CD|$$

If an end of a linear dimension is to a circle, it is actually referenced to an edge which approximates that circle in a faceted solid modeling system. Edges which approximate a circle are tagged as curved edges. When a linear dimension references edge CD and CD is curved, then for an edge MN to be equivalent to CD, MN must be from a circle which has the same radius and center, except for a difference in w. The most common case is moving a dimension from one end of a cylinder to the other. In this case, we can look for an equivalent edge, MN, to be one in which M projects onto C and N onto D or vice versa.

If the test is decision block 140 is positive, then a test is made in decision block 141 to determine if the edge MN is in the plane of the first end. This is true if both vertices A and B are in the plane of the first end. If it is, the procedure jumps to FIG. 11C and function block 134; otherwise, if the dimension is not a baseline dimension, the edge MN is put on the edge list as indicated in function block 142. The procedure is now at the same point that would obtain if the test in decision block 140 were negative. At this point, a test is made in decision block 143 to determine if all the edges have been tested. If not, the procedure returns to function block 139; otherewise, the procedure goes to decision block 137.

At this point reference is made to FIG. 11B where the procedure continues. A test is first made in decision block 144 to determine if the first end to the dimension is an edge. If not, a search is made through the vertices of the model in function block 145 and then, in decision block 146, a determination is made as to whether the vertex at the first end of the dimension projects onto the model vertex R. If so, a test is made in decision block 147 to determine if R is in the plane of the second end of the dimension. If this test is positive, then the procedure jumps to FIG. 11C where, in function block 148, the first end of the dimension is re-referenced and, as noted in function block 149, a broken extension line is not required. At this point, the procedure exits.

Returning to decision block 147, if R is not in the plane of the second end of the dimension, then a test is made in decision block 150 to determine if R is in the plane of a vertex or edge in the list. If so, the procedure jumps to function block 151 in FIG. 11C where both ends of the dimension are re-referenced, and then the procedure goes to function block 149.

On the other hand, if the test in decision block 150 is negative, the procedure arrives at the same point that would obtain if the test in decision block 146 were negative. A test is next made in decision block 152 to determine if all the vertices have been tested and, if not, the procedure returns to function block 145; otherwise, the procedure goes to function block 153 where a broken extension line is required. At this point, the procedure exits.

Returning to decision block 144, if the first end of the dimension is on an edge, then a search is made through the edges of the model in function block 154 and, in decision block 155, a test is made to determine if the model edge MN is equivalent to the first edge. If it is, then a test is made in decision block 156 to determine if edge MN is in the plane of the second end of the dimension. If it is, the procedure jumps to function block 148 in FIG. 11C; otherwise, a test is made in decision block 157 to determine if edge MN is in the plane of a vertex or edge on the list. If it is, the procedure jumps to function block 151 in FIG. 11C; otherwise, a test is made in decision block 158 to determine if all the edges have been tested. If not, the procedure returns to function block 154; otherwise, then to function block 153 from which the procedure exits.

In the case of baseline dimensions, the procedure according to the invention finds the plane through the first vertex and perpendicular to a unit vector, w, and checks to see if the other end each dimension can be moved to an equivalent vertex on that plane. For non-baseline dimensions, the procedure projects vertices of a given dimension onto other planes perpendicular to the vector, w, and tests to see if vertices exist for both ends of the dimension in those positions on any plane. An alternate method for handling the non-baseline case is to (1) find the plane through the first vertex and perpendicular to the vector, w, (if it exists) and see if the other end of the dimension can be moved to an equivalent vertex, (2) repeat for the second vertex, and (3) for each plane perpendicular to the vector, w, (except those already tested) see if vertices exist for both ends of the dimension.

Variations from the general solution presented are possible. For example, the code would run faster if the user handled some of the exceptional cases manually. One option is to have the system try to project the second end of the dimension into the plane of the first and vice versa but not to try to project both ends into a third plane. Another option is to restrict the search to planes which exist in the model. This is described in FIGS. 12 and 13.

Figure 12:
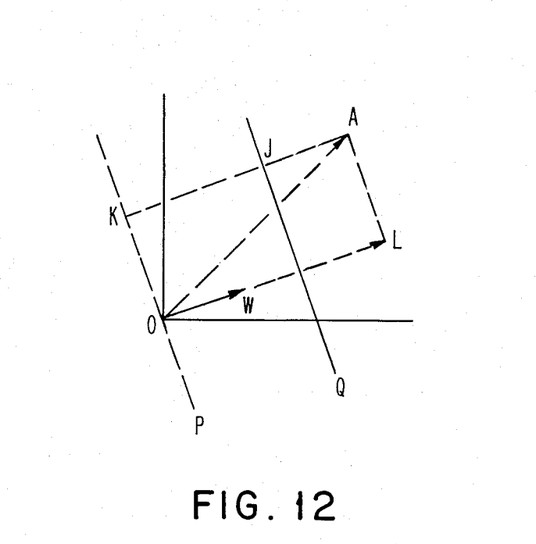
FIG. 12 is vector drawing in three dimensional space which illustrates the operations according to the procedure of the present invention.

FIG. 12 helps to visualize these operations. In FIG. 12, the vector, w, is in the plane of the paper and is a unit vector. Let A be a vertex referenced by the dimension in question and O be the origin of the coordinate system. Then the inner product of vector A and unit vector w is m, the length of vector L, the projection of A onto w.

$m = Aw$

The head of vector L is in the plane containing A and perpendicular to w. This plane has a normal equal to v and its d value equals m, so we can find if it exists in the model. This method also can be used to find the plane containing the other vertex of the dimension which is perpendicular to w, if it exists.

Figure 13:
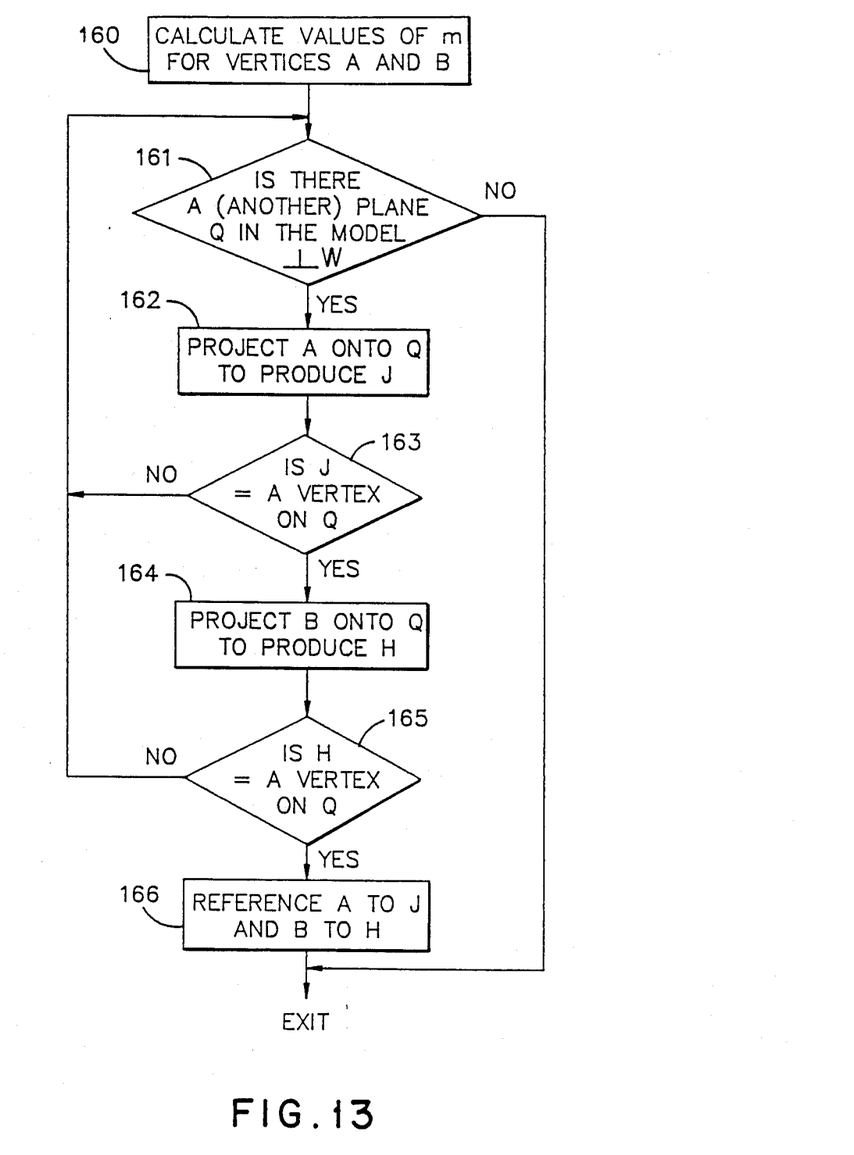
FIG. 13 is a flow chart showing the procedure called from the flow chart of FIGS. 10A and 10B.

Now, let us deal with an arbitrary plane, Q, which is perpendicular to he vector, w. Let P be the plane through the origin which is perpendicular to w. If K is the projection of A onto P in the direction of w, then the signed length A−K is equal to that of L, namely m. The point K is then found as $K = A - mw.$ If the origin is projected onto Q along w, the projection is dw, where d is the constant term in the definition of the plane Q. If J is the projection of A onto Q along the direction of W, then $J = K + dw,$ and substituting for K from above, $J = A + (d - m)w.$ To check for the equality of J with a vertex S on Q, we use a tolerance, t, to allow for numerical inaccuracies. If $|J_r - S_r| < t$ for $r = x,y,z$, then $J = S$. The algorithm incorporating these tests is shown in FIG. 13 for a non-baseline dimension which references vertices A and B. This procedure is called from function block 116 in FIG. 10A.

With reference to FIG. 13, the first thing that is done is to calculate the values of m for the vertices A and B as indicated by function block 160. Then, in decision block 161, a test is made to determine if there is a plane, Q, in the model which is perpendicular to the vector, w. Assuming initially that the test in decision block is positive, the vertex A is projected onto plane Q to produce J as indicated in function block 162. This is followed by a test in decision block 163 to determine if J is equal to a vertex on plane Q. If it is not, control returns to decision block 161; otherwise, a vertex has been found on plane Q and so vertex B is next projected onto plane Q to produce H as indicated in function block 164. This in turn is followed by a test in decision block 165 to determine if H is equal to a vertex in plane Q. If it is not, control returns to decision block 161; otherwise, vertices A and B are referenced to J and H in plane Q, and the procedure exits. Returning briefly to decision block 161, if there is no plane Q in the model which is perpendicular to the vector, w, then the procedure exits.

Figure 14:
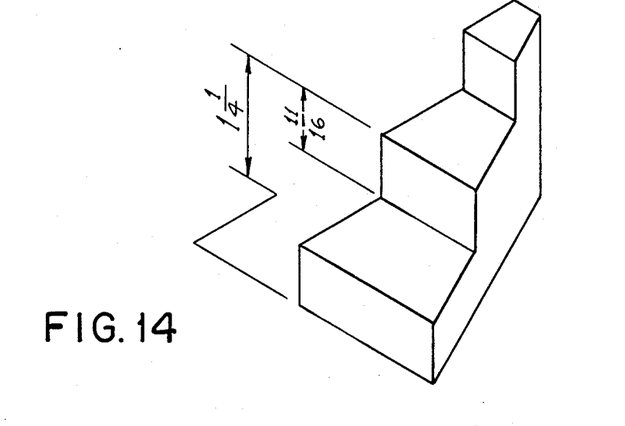
FIGS. 14 and 15 are axonometric views of solid models dimensioned according to the procedure of the present invention.
Figure 15:
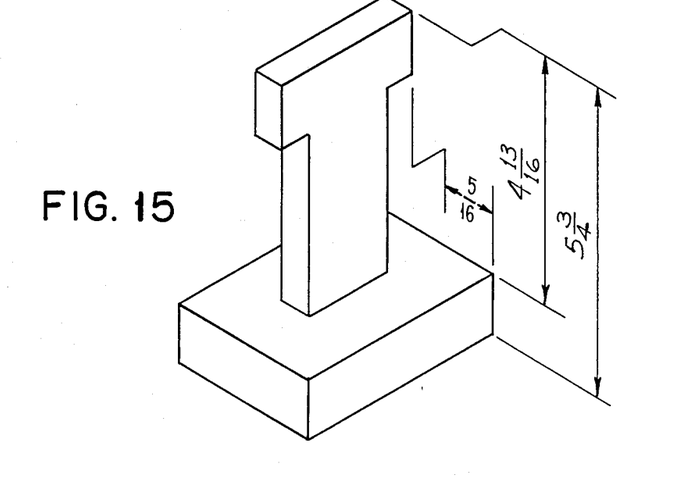

The foregoing procedure makes it easy for the user to put dimensions in the planes of the object as shown in FIG. 1. The 3⅛ dimension of FIG. 2 will become a 3D dimension with a broken extension line. FIG. 14 shows how 3D dimensions can be used to avoid the extra construction lines of FIG. 3, and FIG. 15 shows that 3D dimensions can be used to avoid referencing linear dimensions to edges and surfaces as was done in FIG. 4. It should be noted that there is a default position for the break in the extension lines so that the procedure for the entry of the dimension is unchanged by the fact that a 3D dimension may result.

3D dimensions solve the baseline problem of FIG. 6 for both linear and angular dimensions. The procedure described solves the problem of superimposed vertices for linear dimensions. There is a corresponding problem of superimposed edges for angular dimensions which can be solved in a similar way.

Therefore, while the invention has been described in terms of a preferred embodiment, those skilled in the art will recognize that modifications can be made without departing from the scope and spirit of the invention as set forth in the appended claims.

Having thus described the invention, what is claimed as new and desired to be secured by Letters Patent is as follows:

1. A computer aided drafting procedure for presenting, for a three dimensional object to be modeled in a general purpose computer, dimensional and tolerance parameters appropriate to changes of view or parameters comprising the steps of:

for linear dimensions, obtaining by said computer two user specified vertices on the object;

using by said computer a first of one said user specified vertices together with a locally specified coordinate system to compute a plane of a dimension between said two vertices;

testing by said computer a second one of said user specified vertices to determine if it is in the computed plane of the dimension;

if the second of said two user specified vertices is in the plane of the said dimension, drawing by said computer an extension line from said second vertex in said plane and then drawing by said computer an extension line from said first vertex, a dimension line with arrowheads at first and second ends of said dimension line and dimension text in said plane between said extension lines; but if said second vertex is not in said plane, determining by said computer if the dimension is displayed on a computer generated three dimensional model of said object and, if so, drawing by said computer an extension line from said second vertex with a dogleg break and then drawing by said computer said extension line from said first vertex, said dimension line with arrowheads and dimension text in said plane between said extension lines.

2. The computer aided drafting procedure according to claim 1 in the case where said second vertex is not in said plane and it is determined by said computer that the dimension is being created for a drawing as opposed to the model further comprising for baseline dimensions the steps of:

computing by said computer a plane through the first vertex of said two vertices and perpendicular to a unit vector, w;

testing an equivalent vertex to said second vertex by said computer to determine if the second end of the dimension can be moved to said equivalent vertex on that plane;

and if so, testing by said computer to determine if the equivalent vertex is in the plane of the dimension, and if so drawing by said computer an extension line from said equivalent vertex and then drawing by said computer said extension line from said first vertex, said dimension line with arrowheads and dimension text between said extension lines, otherwise, drawing by said computer said extension line from said second vertex with a dogleg break and then drawing by said computer said extension line from said first vertex and said dimension line with arrowheads and dimension text between said extension lines.

3. The computer aided drafting procedure according to claim 2 in the case where said second vertex is not in said plane and it is determined, by said computer, that the dimension is being created for a drawing as opposed to the model further comprising for non-baseline dimensions the steps of:

testing, by said computer, to determine if said vertices project parallel to said unit vector, w, onto other equivalent vertices in the model;

testing, by said computer, to determine if equivalent vertices exist for both ends of the dimension in those positions on the same plane perpendicular to w;

and if so, testing, by said computer, to determine if the second vertex is in the plane of the dimension, and if so, drawing, by said computer, an extension line from said equivalent vertex and then drawing, by said computer, said extension line from said first vertex and said dimension line with arrowheads and dimension text between said extension lines, otherwise, drawing, by said computer, said extension line from said second vertex with a dogleg break and then drawing, by said computer, said extension line from said first vertex and said dimension line with arrowheads and dimension text between said extension lines.

4. The computer aided drafting procedure according to claim 2 in the case where said second vertex is not in said plane and it is determined, by said computer, that the dimension is being created for a drawing as opposed to the model further comprising for non-baseline dimensions the steps of:

computing, by said computer, a projection of said vertices onto other planes perpendicular to said unit vector, w;

testing, by said computer, to determine if vertices exist for both ends of the dimension in those positions on any plane;

and if so, testing, by said computer, to determine if the second vertex is in the plane of the dimension, and if so, drawing, by said computer, an extension line from said equivalent vertex and then drawing, by said computer, said extension line from said first vertex and said dimension line with arrowheads, otherwise, drawing, by said computer, said extension line from said second vertex with a dogleg break and then drawing, by said computer, said extension line from said first vertex and said dimension line with arrowheads and dimension text between said extension lines.

5. The computer aided drafting procedure according to claim 2 in the case where said second vertex is not in said plane and it is determined, by said computer, that the dimension is being created for a drawing as opposed to the model further comprising for non-baseline dimensions the steps of:

computing, by said computer, the plane through the first vertex and perpendicular to said unit vector, w;

testing, by said computer, to determine if the other end of the dimension can be moved to an equivalent vertex;

computing, by said computer, the plane through the second vertex and perpendicular to said unit vector, w;

testing, by said computer, to determine if the other end of the dimension can be moved to an equivalent vertex;

for each plane perpendicular to said unit vector, w, testing, by said computer, to determine if vertices exist for both ends of the dimension and selecting, by said computer, one of the planes satisfying this criteria;

testing, by said computer, to determine if the equivalent vertices are in the plane of the dimension, and if so, drawing, by said computer, extension lines from said equivalent vertices and then drawing, by said computer, said dimension line with arrowheads and dimension text between said extension lines, otherwise, drawing, by said computer, extension lines from said vertices with dogleg breaks and then drawing, by said computer, said dimension line with arrowheads and dimension text between said extension lines.

6. The computer aided drafting procedure according to claim 1 for nonlinear dimensions further comprising the steps of:

testing, by said computer, to determine if the dimension is an angular or a curve dimension and, if so, computing, by said computer, a projection of edges to be dimensioned onto a plane of the local coordinate system;

testing, by said computer, to find a point at which an extension of a first dimensioned edge intersects a cylinder whose axis is perpendicular to said plane and centered at the intersection of the projected dimensioned edges;

drawing, by said computer, a first extension line parallel to said first dimensioned edge, and drawing, by said computer, a dimension line with arrowheads and dimension text in the dimension plane;

testing, by said computer, to determine if the intersection of an extension of the second dimension line and the cylinder is in the dimension plane, and if so, drawing, by said computer, a second extension line parallel to the second edge, to be dimensioned, otherwise, drawing, by said computer, a second extension line parallel to said second edge but with a dogleg break perpendicular to said plane of said local coordinate system half way between the arrow end of the line, near the vertex.

7. A computer aided drafting procedure for presenting, for a three dimensional object to be modeled in a general purpose computer, dimensional and tolerance parameters appropriate to changes of view or parameters comprising the steps of:

obtaining by said computer two user specified parameters on the object;

using by said computer a first one of said user specified parameters together with a locally specified coordinate system to compute a plane of a dimension, said parameters being a vertex, an edge, an arc or a circle;

testing a second one of said user specified parameters to determine if it is in the plane of the dimension;

if the second one of said user specified parameters is in the plane of said dimension, drawing by said computer an extension line from said second parameter in said plane and then drawing by said computer an extension line from said first parameter, a dimension line with arrowheads and dimension text in said plane between said extension lines; but if said second parameter is not in said plane, drawing by said computer an extension line from said second parameter with a dogleg break and then drawing by said computer said extension line from said first parameter, said dimension line with arrowheads and dimension text in said plane between said extension lines.

* * * * *